F. W. NOLTE.
EYEGLASSES.
APPLICATION FILED DEC. 6, 1907.
952,626.
Patented Mar. 22, 1910.
2 SHEETS—SHEET 1.
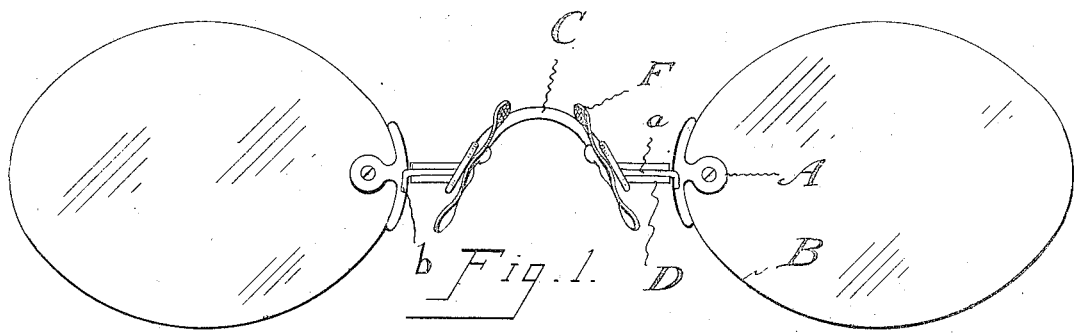
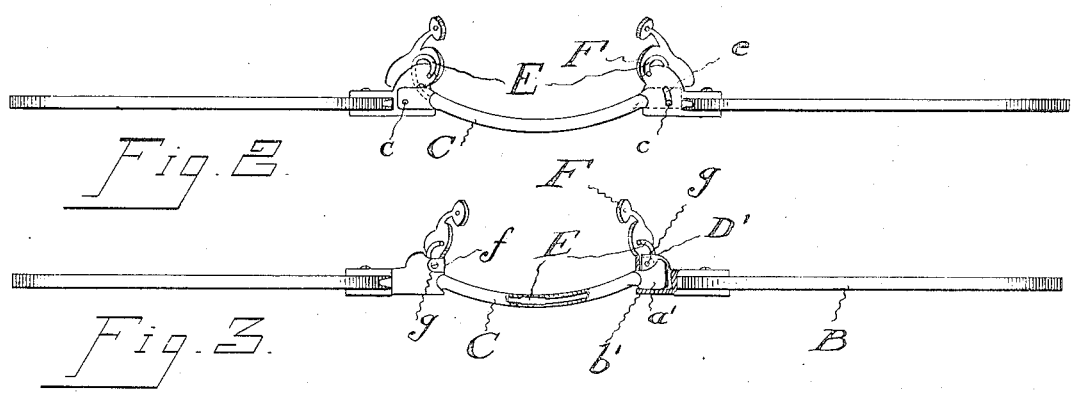
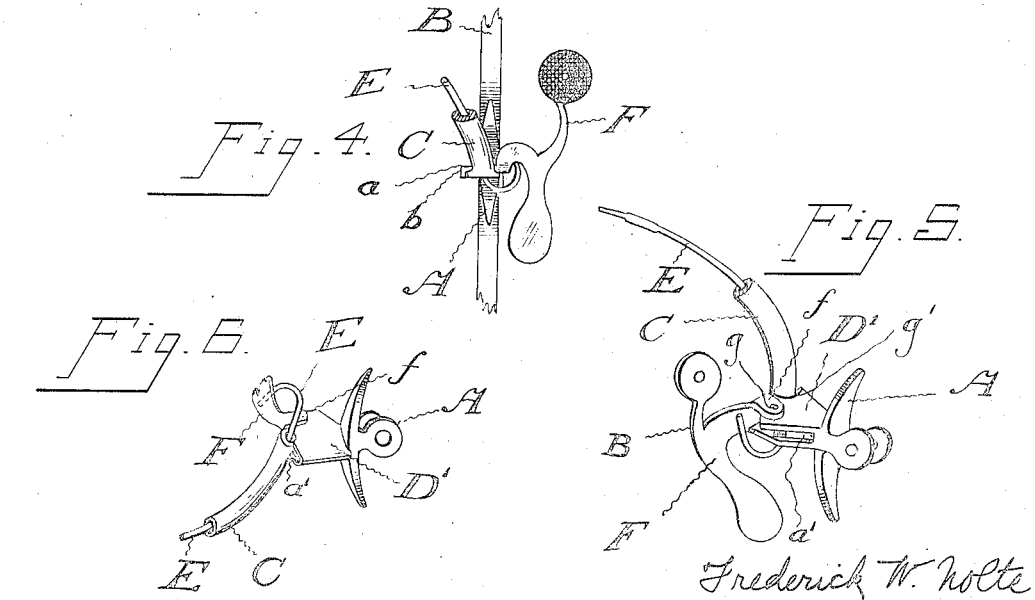
WITNESSES:
INVENTOR.
Frederick W. Nolte
BY Ridout & Maybee
ATTORNEYS

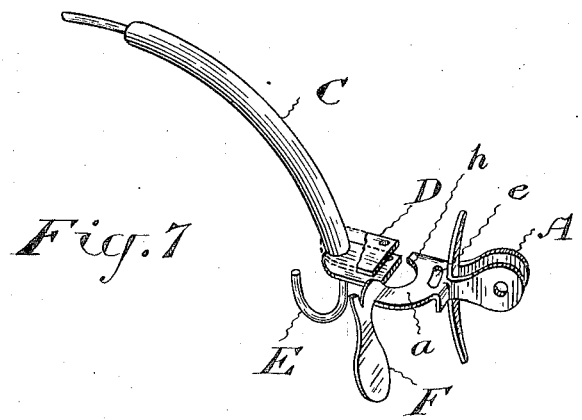
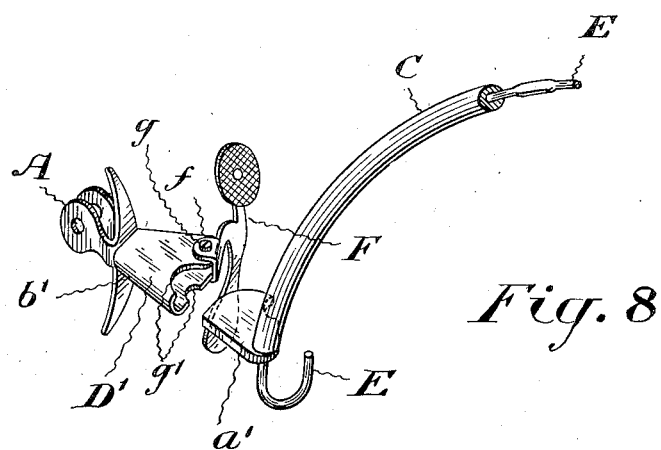

UNITED STATES PATENT OFFICE.

FREDERICK W. NOLTE, OF VICTORIA, BRITISH COLUMBIA, CANADA.

EYEGLASSES.

952,626.  Specification of Letters Patent.  Patented Mar. 22, 1910.

Application filed December 6, 1907. Serial No. 405,339.

*To all whom it may concern:*

Be it known that I, FREDERICK W. NOLTE, of Victoria, Province of British Columbia, Canada, have invented certain new and useful Improvements in Eyeglasses, of which the following is a specification.

My invention relates to eyeglasses of the type in which the lenses have a vertical pivotal connection with the bridge, and the nose pieces are spread by grasping the lenses and bending them forwardly.

My object is to devise a simple construction for such glasses which will be neat, strong and reliable in action.

A further object is to arrange such an eyeglass so that the nose pieces may have a movement independent of the lenses and bridge, and so that a single spring suffices to give the spring tension tending to maintain the lenses and guards in their normal positions.

In its simplest form the lens-clamp is fulcrumed on the lower end of the bridge so that an independent pivot pin is unnecessary. The spring is afforded by a bent wire passing through the hollow bridge, its end being bent round to engage the nose grips so that the spring tension upon these is given by the torsional spring of the wire.

In the elaborated form of my device the nose pieces instead of being rigidly connected with the lens-clamps are pivoted thereon, suitable stops being provided limiting the movements of the lens-clamps on the bridge, and the nose pieces on the lens-clamps. In this form of my device, as in the simple form, a single torsion spring, held within the hollow bridge, serves to give the spring tension, tending to maintain the lenses and guards in their normal positions.

Figure 1 is a rear elevation, on a large scale, of a pair of eyeglasses constructed in accordance with my invention. Fig. 2 is a plan view of the same, partly broken away at the right hand side. Fig. 3 is a plan view of the elaborated form of the device. Fig. 4 is an inside elevation of one of the nose pieces and its connections, shown on a larger scale than in Figs. 1 and 2. Fig. 5 is a perspective detail of part of the bridge, one of the lens-clamps and one of the nose pieces, shown in Fig. 3. Fig. 6 is a perspective detail of the under side of the parts shown in Fig. 5. Fig. 7 is a greatly enlarged perspective detail of part of the frame of the eye-glasses shown in Figs. 1 and 2 with the lower end of the bridge and the lens clamp separated. Fig. 8 is a similar view of parts of the frame of the form shown in Fig. 3.

In the drawings like letters of reference indicate corresponding parts in the different figures.

A are the lens-clamps, which are in general of ordinary shape, and are clamped on the lenses B, as shown in the drawings.

In Figs. 1 and 2 the bridge C is provided at each of its lower ends which are rounded with laterally extending jaws D, between which the inwardly extending plate $a$ of the lens-clamp is fitted. This plate $a$, it will be noted, is provided at its forward edge with a shallow depending flange $b$, which not only stiffens the plate but gives a finished appearance to its forward edge. The plate $a$ is notched at $h$ to fit against and fulcrum on the bridge and is retained in suitable pivotal engagement with its fulcrum on the rounded lower end of the bridge by the pin $c$, which passes through holes in the jaws D, and through an arc-shaped slot $e$ in the plate $a$, the arc being struck with a radius intersecting the center of the lower end of the bridge. In Fig. 2 the upper jaw D at the right hand side is broken away to show this slot. The notching of a part of the lens clamp to fit against the rounded bridge permits of the lens turning on a center substantially coincident with the axis of the end of the bridge. See particularly Fig. 7. I use the term "fulcrum" as applied to the joint between the lens clamp and the bridge as being broader than "pivot", the "fulcrum" being formed by the notched part of the lens clamp and the rounded end of the bridge or the alternative arrangement shown in Figs. 3 and 5 hereinafter referred to. The bore of the hollow bridge is preferably somewhat oval in section, and the wire E of the spring is slightly flattened at the center, as shown particularly in Fig. 3, to fit the oval shaped bore. The wire is thus prevented from turning in the bridge. The ends of this wire spring pass out axially through the lower ends of the bridge, and are bent round to engage the nose pieces F, which are formed integral with or secured to the lens clamps. The torsional spring of the wire thus tends to press the nose pieces inwardly. This movement is limited in either direction by the arc-shaped slots. The flanges $b$ engaging the forward sides of the lower part of the jaws D also assist in limiting the inward movement of the nose pieces.

In Figs. 3 and 5 I illustrate a preferred form of construction. In this construction a laterally extending plate $a'$ is formed at the lower end of the bridge at each side, and the jaws $D'$ are formed on the lens-clamp. The jaws are integrally connected at the front of the glasses, as indicated at $b'$, the part $b'$ corresponding to the flange $b$ in Figs. 1 and 2. Against this part $b'$ the plate $a'$ abuts to insure that the lens-clamp is not forced by the action of the spring past its normal position. The jaws $D'$ are notched at $g'$ to fit against and fulcrum on the lower end of the bridge (see Fig. 8) in the same manner as the plate $a$ fulcrums on the lower end of the bridge in the form shown in Figs. 1 and 2. The nose piece, however, instead of being rigidly connected with the lens clamp is pivotally connected thereto, out of line with the point of turning of the lens-clamp on the bridge being provided with the jaws $f$, which embrace the jaws $D'$ at their inner side and are connected therewith by the pivot pin $g$. It will be noticed that the part of the nose piece connecting the jaws $f$, when the nose piece is in its normal position, contacts with the inner side of the jaws $D'$ and thus forms a stop preventing the nose piece being pressed inwardly by the spring past its normal position. The nose piece is, however, free to rock outwardly against the tension of the spring to the necessary extent to adapt it to the shape or size of the nose. The spring E is precisely similar to the spring employed in the form shown in Figs. 1 and 2, and its lower bent end engages the nose piece as shown. The pressure of the spring thus tends to retain the parts in the position shown particularly in Figs. 3 and 5. The lens-clamp and nose piece are, however, free to rock on the bridge, as in the simpler construction, while the nose piece has an independent movement of its own which enables it to adapt itself to the nose without imparting any movement to the lens-clamp. Thus with my construction a single concealed spring, visible only at its lower end, permits of this independent or combined movement of the nose piece and lens-clamp.

The operation of the glasses has already been indicated in part. With either form it will be seen that the nose pieces may be spread to enable the eyeglasses to be placed on the nose by grasping the lenses and bending them forwardly in a plane which intersects the horizontal axis of the lenses at right angles to the surfaces thereof. As the bending movement takes place directly on the lower ends of the bridge the utmost neatness and compactness of construction is attained. Also in the preferred form of my device, it so happens that the nose guards are not exactly adapted to the nose when in the normal position a yielding movement is provided for, which enables them to adjust themselves quite independent of the lens-clamps, and this independent movement, when only a single spring is employed, is due to the eccentric pivoting of the lens-clamps and nose-guards.

By fulcruming the lens clamps on the bridge I obtain two main advantages. The spring tension on the lens clamps is obtained solely from the torsion of the spring wire and the loops at the lower ends thereof are not bent or twisted out of shape. Owing to this, and also to the fact that the turning points of the spring wire and the lens clamps are the same the action of the lens clamp is very smooth and the tension even. Also by dispensing with intermediate pivots the plates or jaws forming the joints connecting the lens clamp and bridge may be made of the maximum width available and the joints thus rendered strong and free from objectionable wiggle.

What I claim as my invention is:—

1. In eyeglasses the combination of a bridge; a lens-clamp movable relative to the bridge; means restricting the movement of the lens-clamp on the bridge to a horizontal plane intersecting the lens substantially at right angles to its surfaces comprising jaws formed on one of the parts and a projection on the other part fitting between the jaws; and a fulcrum between the lens-clamp and the bridge formed by an engaging part on one and a notch formed in the other.

2. In eyeglasses the combination of a hollow bridge and a lens-clamp, one notched to fit against and turn on the other; a torsion spring held within the hollow bridge and having its end extending out through the lower end of the bridge and bent up to engage the lens-clamp to tend to retain the latter in its normal position; and a stop preventing the lens-clamp being moved by the spring past the normal position.

3. In eyeglasses the combination of a hollow bridge; a lens-clamp movable relative to the bridge; means restricting the movement of the lens-clamp on the bridge to a horizontal plane intersecting the lens substantially at right angles to its surface comprising jaws formed on one of the parts and a projection on the other part fitting between the jaws; a fulcrum between the lens-clamp and the bridge formed by an engaging part on one and a notch formed in the other; a torsion spring held within the hollow bridge and having its end extending out through the lower end of the bridge and bent up to engage the lens-clamp to tend to retain the latter in its normal position; and a stop preventing the lens-clamp being moved by the spring past the normal position.

4. In eyeglasses the combination of a hollow bridge; a lens-clamp movable relative to the bridge; means restricting the movement of the lens-clamp on the bridge to a horizontal plane intersecting the lens substantially at right angles to its surfaces comprising jaws formed on one of the parts and a projection on the other part fitting between the jaws; a fulcrum between the lens-clamp and the bridge formed by an engaging part on one and a notch formed in the other; a torsion spring held within the hollow bridge and having its end extending out through the lower end of the bridge and bent up to engage the lens-clamp to tend to retain the latter in its normal position; and means for limiting the rocking movement of the lens-clamp in either direction.

5. In eyeglasses the combination of a hollow bridge; a lens-clamp having a pivotal movement on the bridge; a nose piece having a pivotal movement on the lens-clamp eccentric to the pivotal movement of the said lens-clamp; a torsion spring held within the hollow bridge, and having its end extending out through the lower end of the bridge and bent up to engage the nose piece to tend to retain the nose piece and lens-clamp in their normal positions; and stops preventing the lens-clamp and nose piece being moved by the spring past their normal positions.

Victoria, B. C., 20th November, 1907.

FREDERICK W. NOLTE.

Signed in the presence of—
A. A. CLAYTON,
N. E. BRAGG.